United States Patent
Richmond et al.

(10) Patent No.: US 12,505,198 B2
(45) Date of Patent: Dec. 23, 2025

(54) MESSAGE VERIFICATION FOR VEHICLE ECUS

(71) Applicant: Ford Global Technologies, LLC, Dearborn, MI (US)

(72) Inventors: Tim Richmond, Lake Linden, MI (US); Jacob David Nelson, Westland, MI (US); Cameron Smyth, Wyandotte, MI (US); Omar Fayad, Orland Park, IL (US); Jeremy L. Russell, Livonia, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 18/625,369

(22) Filed: Apr. 3, 2024

(65) Prior Publication Data
US 2025/0315513 A1   Oct. 9, 2025

(51) Int. Cl.
*G06F 21/44* (2013.01)
(52) U.S. Cl.
CPC .................... *G06F 21/44* (2013.01)
(58) Field of Classification Search
CPC ....................................... G06F 21/44
See application file for complete search history.

(56) References Cited

U.S. PATENT DOCUMENTS

| | | | |
|---|---|---|---|
| 9,705,678 B1* | 7/2017 | Wang | G06F 21/602 |
| 10,630,481 B2 | 4/2020 | Lawlis et al. | |
| 11,956,372 B2* | 4/2024 | Wei | H04L 63/0236 |
| 2007/0180495 A1* | 8/2007 | Hardjono | H04W 12/069 726/3 |
| 2008/0022389 A1* | 1/2008 | Calcev | H04W 40/28 726/14 |
| 2020/0304994 A1* | 9/2020 | Breuer | H04W 4/40 |
| 2021/0168171 A1* | 6/2021 | Blouin | H04L 63/00 |
| 2022/0311751 A1 | 9/2022 | Li et al. | |
| 2023/0060782 A1* | 3/2023 | Wang | G06F 21/563 |
| 2023/0291726 A1* | 9/2023 | Dekel | H04L 63/083 |

FOREIGN PATENT DOCUMENTS

EP   4411623 A1 *   8/2024   .......... G06F 11/0793

OTHER PUBLICATIONS

Bretting A., et al., "Vehicle Control Unit Security using Open Source AUTOSAR," Chalmers, 2015, 127 pages.

* cited by examiner

*Primary Examiner* — Brian Whipple
(74) *Attorney, Agent, or Firm* — Christopher Storms; Brooks Kushman P.C.

(57) ABSTRACT

A computer includes a processor and a memory, and the memory stores instructions executable by the processor to nondeterministically select a message from a plurality of messages, the messages including respective message authentication codes; set a current trust status by verifying the message authentication code from the selected message; and forward the selected message to a recipient in response to a previous trust status being trusted.

20 Claims, 4 Drawing Sheets

MESSAGE VERIFICATION FOR VEHICLE ECUS

BACKGROUND

Modern vehicles typically include several electronic control units (ECUs) that communicate with each other by sending messages through a Controller Area Network (CAN) bus. The messages can follow a format such as database CAN (DBC) or AUTOSAR XML (ARXML). DBC files typically include designated bits for identifying the message, interpreting the payload, and carrying the payload.

DETAILED DESCRIPTION

Figure 1:
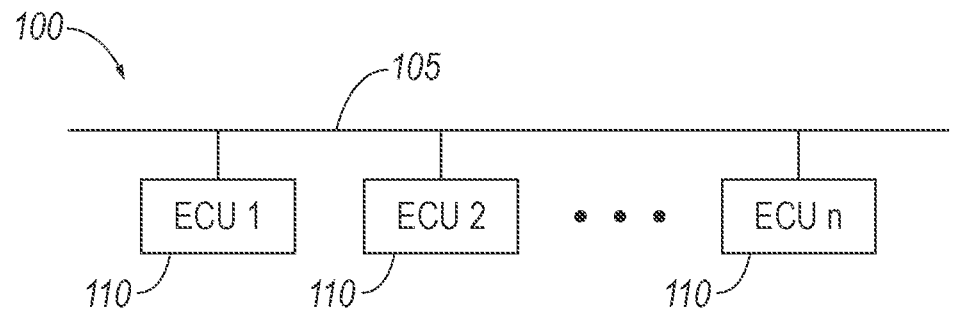
FIG. 1 is a block diagram of an example vehicle.

Modern vehicles typically include several electronic control units (ECUs) that control various functions of the vehicle. The ECUs can communicate with each other by sending messages through a Controller Area Network (CAN) bus. The techniques herein can provide lower latency for messages—i.e., faster performance of the network—while still maintaining high security for messages. A computer on board a vehicle is programmed to nondeterministically select a message from a plurality of messages, set a current trust status by verifying a message authentication code from the selected message; and forward the selected message to a recipient in response to a previous trust status being trusted.

The network can achieve lower latency by forwarding a message based on a previous trust status determined from a previous message, rather than based on the current trust status determined from the current message. As a result, the verification of the current message can occur in parallel with or after the forwarding of the current message, meaning that the message can arrive faster. Further, the network can achieve lower latency by verifying only the selected subset of the messages rather than all the messages. The network can thus support messages being sent at a faster rate than the rate of verification.

High security is maintained on the network by nondeterministically selecting the messages for verification to set the current trust status. The nondeterministic selection can help disrupt a spoofing attack. Because the selection of the messages is nondeterministic, an outside actor may not be able to predict in advance which messages will be selected. That means that the outside actor cannot only spoof messages that would not be selected. If spoofing occurs, the computer can quickly detect the spoofing.

A computer includes a processor and a memory, and the memory stores instructions executable by the processor to nondeterministically select a message from a plurality of messages, the messages including respective message authentication codes; set a current trust status by verifying the message authentication code from the selected message; and forward the selected message to a recipient in response to a previous trust status being trusted.

In an example, the instructions to nondeterministically select the selected message may include instructions to randomly select the selected message.

In an example, the instructions to nondeterministically select the selected message may include instructions to, upon receiving a first message of the messages, randomly determine whether to select the first message as the selected message. In a further example, the instructions to nondeterministically select the selected message may include instructions to, upon randomly not selecting one of the messages as the selected message for a consecutive number of times equal to a ceiling value, select a next message as the selected message. In a yet further example, the instructions may further include instructions to adjust the ceiling value based on verifying the message authentication code.

In another yet further example, the instructions may further include instructions to increase the ceiling value upon successfully verifying the message authentication code.

In another yet further example, the instructions may further include instructions to decrease the ceiling value upon unsuccessfully verifying the message authentication code.

In another further example, the instructions may further include instructions to adjust a probability of randomly selecting the first message as the selected message based on determining the current trust status.

In an example, the instructions to set the current trust status may include instructions to, upon successfully verifying the message authentication codes of selected messages including the selected message for a consecutive number of times equal to a trust threshold, set the current trust status to trusted.

In an example, the instructions to set the current trust status may include instructions to, upon unsuccessfully verifying the message authentication codes of selected messages including the selected message for a consecutive number of times equal to a distrust threshold, set the current trust status to distrusted.

In an example, the instructions may further include instructions to discard the selected message in response to the previous trust status being distrusted.

In an example, the instructions may further include instructions to forward a nonselected message from the messages to a recipient in response to the previous trust status being trusted.

In an example, the instructions may further include instructions to discard a nonselected message from the messages in response to the previous trust status being distrusted.

In an example, the plurality of the messages may include a same value of message identifier, and the current trust status and previous trust status may be specific to the value of the message identifier.

In an example, the messages may be controller area network (CAN) messages.

A method includes nondeterministically selecting a message from a plurality of messages, the messages including respective message authentication codes; setting a current trust status by verifying the message authentication code from the selected message; and forwarding the selected message to a recipient in response to a previous trust status being trusted.

In an example, nondeterministically selecting the selected message may include randomly selecting the selected message.

In an example, nondeterministically selecting the selected message may include, upon receiving a first message of the messages, randomly determining whether to select the first message as the selected message.

In an example, setting the current trust status may include, upon successfully verifying the message authentication codes of selected messages including the selected message for a consecutive number of times equal to a trust threshold, setting the current trust status to trusted.

In an example, the method may further include discarding the selected message in response to the previous trust status being distrusted.

With reference to the Figures, wherein like numerals indicate like parts throughout the several views, a computer includes a processor and a memory, and the memory stores instructions executable by the processor to nondeterministically select a message 200 from a plurality of messages 200, the messages 200 including respective message authentication codes 220; set a current trust status by verifying the message authentication code 220 from the selected message 200a; and forward the selected message 200a to a recipient in response to a previous trust status being trusted.

With reference to FIG. 1, the computer may be on board a vehicle 100. The vehicle 100 may be any passenger or commercial automobile such as a car, a truck, a sport utility vehicle, a crossover, a van, a minivan, a taxi, a bus, etc. The vehicle 100 includes a Controller Area Network (CAN) bus 105 and a plurality of electronic control units (ECUs) 110.

The CAN bus 105 can communicatively couple the ECUs 110, and the ECUs 110 may transmit and receive data through the CAN bus 105. The CAN bus 105 can use multiplex electrical wiring to interconnect the ECUs 110. The CAN bus 105 can be divided into subnetworks connected together, e.g., by a gateway module.

The ECUs 110 are microprocessor-based computing devices, e.g., generic computing devices including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. Each ECU 110 can thus include a processor, a memory, etc. The memory of each ECU 110 can include media for storing instructions executable by the processor as well as for electronically storing data and/or databases, and/or the ECU 110 can include structures such as the foregoing by which programming is provided. The term "computer" herein may refer to a single ECU 110 or multiple ECUs 110 acting together.

The ECUs 110 can be programmed for performing different functions for the vehicle 100. For example, the ECUs 110 can include an engine control module, a body control module, an accessory control module, a power-steering control module, etc. The vehicle 100 may contain between fifty and one hundred ECUs 110.

Figure 2:
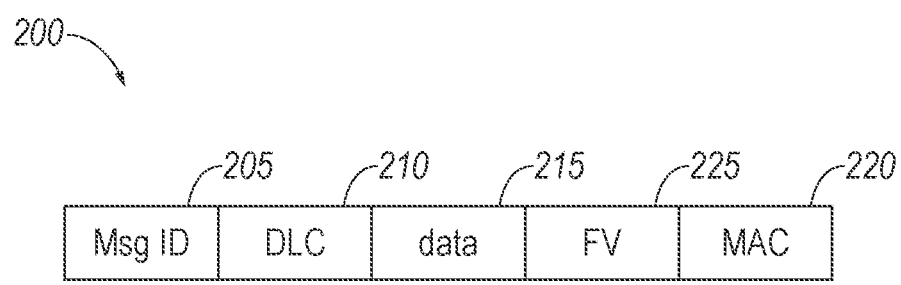
FIG. 2 is a diagram of an example message transmitted between electronic control units on board the vehicle.

With reference to FIG. 2, the ECUs 110 may transmit messages 200 to each other over the CAN bus 105. The messages 200 may be controller area network (CAN) messages, e.g., may follow the database CAN (DBC) format or the AUTOSAR XML (ARXML) format. For example, each message 200 may include a message identifier 205, a data length code 210 after the message identifier 205, and data content 215 after the data length code 210. The message identifier 205 can specify a type or classification of the message 200, e.g., by type of data content 215, priority level, etc. The data length code 210 can specify a bit length of the data content 215. The data content 215 contains the informational content of the message 200, i.e., the payload, e.g., engine RPMs from the engine control module, suspension adjustment instructions from the body control module, etc. Each message 200 may also include the message authentication code 220 and a freshness value 225 as security features, e.g., with the freshness value 225 after the data content 215 and the message authentication code 220 after the freshness value 225.

The freshness value 225 can be periodically refreshed with messages to the ECUs 110, or the freshness value 225 can incorporate a timestamp. The freshness value 225 in a message 200 can be used by the receiving ECU 110 to determine that the message 200 was sent recently, as opposed to a replay attack. In a replay attack, a message 200 containing a security feature is saved and reused later by a third party so that the security feature grants access. The freshness value 225 can prevent a replay attack because the freshness value 225 in the saved message 200 is out of date and thus not accepted by the receiving ECU 110.

The message authentication code 220 is a piece of information included in a message 200 to ensure that the transmitting ECU 110 and the receiving ECU 110 both have the same authentication key. The transmitting ECU 110 generates the message authentication code 220 by performing an operation on some portion of the message 200, e.g., the data content 215, and the receiving ECU 110 performs an operation on the message authentication code 220 to reproduce the authentication key and verify that the reproduced authentication key matches the authentication key stored on the receiving ECU 110.

Figure 3:
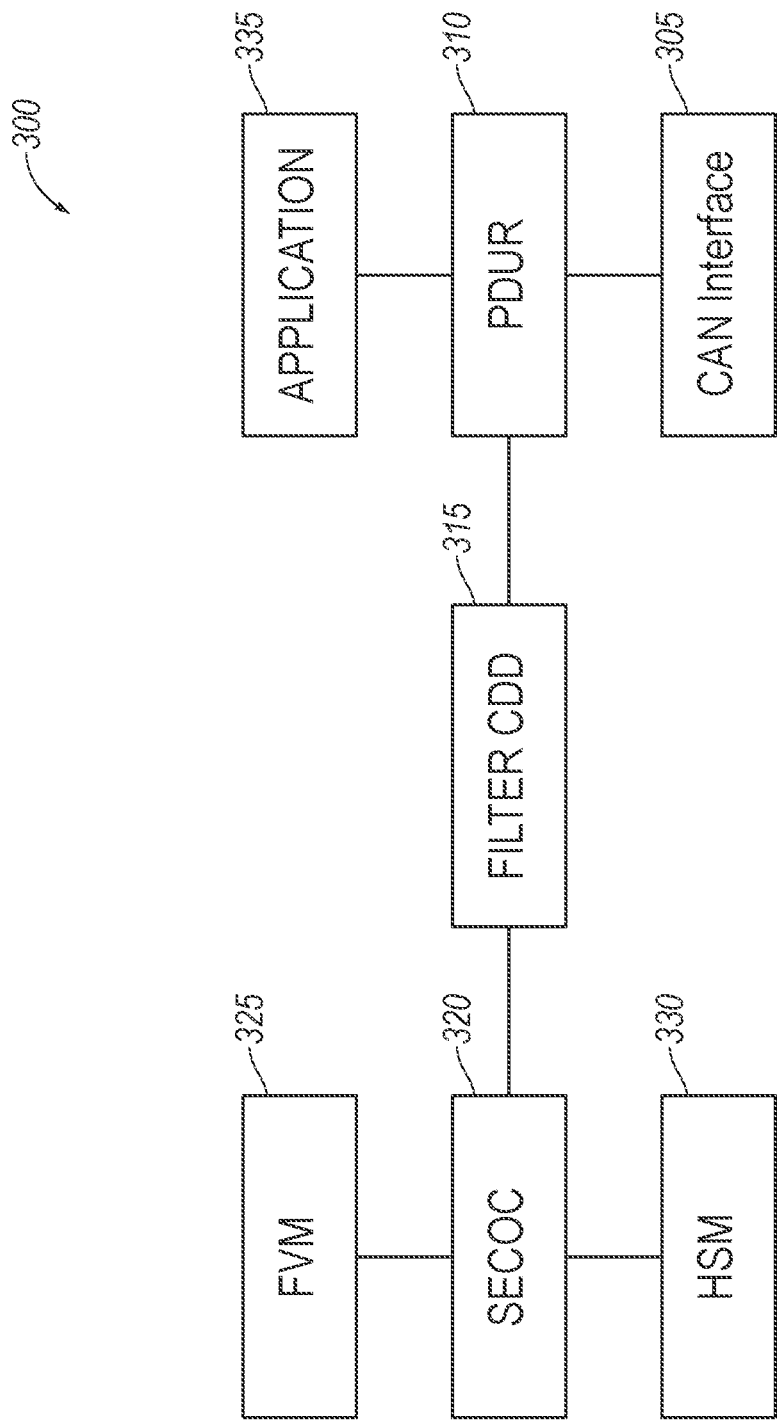
FIG. 3 is a block diagram of an example architecture for transmitting messages onboard the vehicle.

With reference to FIG. 3, the vehicle 100 may include a messaging architecture 300. The messaging architecture 300 may be instantiated on the ECUs 110 and the CAN bus 105. For example, the components of the messaging architecture 300 (described below) may be installed on a single ECU 110. The messaging architecture 300 may include the CAN interface 305, a protocol data unit router (PDUR) 310, a filter configuration and data distribution (filter CDD) block 315, a secure onboard communication (SecOC) block 320, a freshness value manager 325, a hardware security module 330, and at least one application 335. The components of the messaging architecture 300 (except for the filter CDD block 315) may follow the automotive open system architecture (AUTOSAR) standard.

The computer, e.g., the filter CDD, may track a trust status. The trust status may be a flag, e.g., a binary variable, stored in memory. The trust status may have two possible values representing "trusted" and "distrusted," e.g., 1 for trusted and 0 for distrusted. The terms "current" and "previous" refer to the trust status relative to a most recently received message 200. The current trust status is the trust status set as a result of the most recently received message 200 (if selected for verification as described below). The previous trust status is the value of the trust status when the most recently received message 200 is received. The previous trust status was set as a result of the most recent previous message 200 that was selected for verification. When a new message 200 is received, the current trust status becomes the previous trust status.

The trust status, i.e., the current trust status or previous trust status, is specific to the value of the message identifier 205. In other words, the computer may track multiple trust statuses corresponding to different message identifiers 205. When a new message 200 with a message identifier 205 is received, the current trust status for that message identifier 205 becomes the previous trust status for that message identifier 205, and the computer may update the current trust status for that message identifier 205 if the new message 200 is selected for verification.

The CAN interface 305 is the data link layer for communication through the CAN bus 105. The CAN interface 305 moves the data instantiated in the messages 200 between applications 335 running on the ECUs 110. When a message 200 is transmitted through the CAN bus 105, the CAN interface 305 delivers the message 200 to the PDUR 310. For example, the CAN interface 305 may deliver the message 200 directly in the case of a single-frame message 200, or the CAN interface 305 may deliver the message 200 via a CAN transport layer (TP) in the case of a multiframe message 200. The CAN TP may collect the fragments of the multiframe message 200, reassemble the multiframe message 200, and deliver the multiframe message 200 to the PDUR 310.

The computer, e.g., the PDUR 310, is programmed to receive the messages 200 and then transmit the messages 200 to the appropriate component of the messaging architecture 300. The computer, e.g., the PDUR 310, is programmed to forward messages 200 received from the CAN interface 305 to the filter CDD block 315.

The computer, e.g., the filter CDD block 315, may return each message 200 along with the value of the previous trust status, i.e., either trusted or distrusted. The filter CDD is programmed to, in response to receiving a message 200 from the PDUR 310, transmit the previous trust status applicable to the message 200 (e.g., for the message identifier 205 of the message 200) to the PDUR 310. The filter CDD block 315 may also transmit the message 200 itself back to the PDUR 310. For example, the filter CDD block 315 may store a trust status for each message identifier 205, e.g., in a lookup table. The filter CDD block 315 may read the message identifier 205 from the message 200 and return the value of the trust status stored in memory for that message identifier 205. The returned trust status is referred to as the previous trust status because, as will be described below, a current trust status may be determined from the message authentication code 220 in the message 200, and that current trust status may replace the previous trust status.

The computer, e.g., the PDUR 310, is programmed to forward the message 200 to a recipient in response to the previous trust status being trusted. For example, the PDUR 310 is programmed to, in response to receiving a message 200 with a previous trust status of trusted from the filter CDD block 315, forward the message 200 to the application 335. The computer, e.g., the PDUR 310, is programmed to discard the message 200 in response to the previous trust status being distrusted. The PDUR 310 is programmed to, in response to receiving a message 200 with a previous trust status of distrusted from the filter CDD block 315, discard the message 200 and not forward the message 200 to the application 335.

The computer, e.g., the PDUR 310, is programmed to forward or discard the message 200 as just described regardless of whether the message 200 is selected for verification (as will be described below). For example, the PDUR 310 forwards a selected message 200a to a recipient in response to the previous trust status being trusted, and the PDUR 310 forwards a nonselected message 200b to a recipient in response to the previous trust status being trusted. The PDUR 310 discards a selected message 200a in response to the previous trust status being distrusted, and the PDUR 310 discards a nonselected message 200b in response to the previous trust status being distrusted.

The application 335 serves as the recipient and may receive the message 200 from the PDUR 310. The application 335 may use the data content 215 of the message 200 for performing an operation, e.g., controlling the vehicle 100. For example, the data content 215 may include sensor data, and the computer, e.g., the application 335, may control a physical component of the vehicle 100 based on the sensor data, e.g., active suspension, lane-centering, etc.

The computer, e.g., the filter CDD block 315, is programmed to nondeterministically select a message 200 from a plurality of messages 200. For the purposes of this disclosure, "nondeterministically select" is defined as making a selection that is not predictable in advance. For example, the filter CDD block 315 may randomly select the selected message 200a. For example, the filter CDD block 315 may, upon receiving a message 200, randomly determine whether to select that message 200 as the selected message 200a. The filter CDD block 315 may, upon receiving each message 200, randomly determine whether to select that message 200 according to a probability value stored in memory. The probability value for each message 200 may be independent of the probability value for any other message 200; e.g., the probability value may be constant. As one example, the probability value may be 0.2, so each message 200 may have a 20% chance of being randomly selected.

The computer, e.g., the filter CDD block 315, may be programmed to, upon randomly not selecting any of the messages 200 as the selected message 200a for a consecutive number of times equal to a ceiling value 405, select a next message 200 as the selected message 200a. The ceiling value 405 may be stored in the memory of the computer, e.g., of the ECU 110 on which the filter CDD block 315 is executing. As one example, for a ceiling value 405 of 5, the filter CDD block 315, in response to not selecting five messages 200 in a row in the independent random manner described immediately above, selects the next message 200 for verification. The ceiling value 405 can enhance security by providing an upper limit on the number of messages 200 passed before a verification occurs.

The computer, e.g., the filter CDD block 315, may be programmed to, upon randomly selecting a message 200 as the selected message 200a, not select a next message 200 as the selected message 200a for a consecutive number of times equal to a floor value 425. The floor value 425 may be stored in the memory of the computer, e.g., of the ECU 110 on which the filter CDD block 315 is executing. As one example, for a floor value 425 of 1, the filter CDD block 315, in response to selecting a message 200 as the selected message 200a, does not select the next message 200 as the selected message 200a. The filter CDD block 315 then randomly determines whether to select the following message 200 as the selected message 200a, in the manner described above. The floor value 425 can enhance performance by keeping throughput at a sufficiently high level.

The filter CDD block 315 forwards each selected messages 200a to the SecOC block 320, in addition to returning each selected messages 200a with the associated trust statuses to the PDUR 310 as described above. The filter CDD block 315 returns the nonselected messages 200b with the associated trust statuses to the PDUR 310, and the filter CDD block 315 does not forward the nonselected messages 200b to the SecOC. As a result, the SecOC block 320 only receives the selected messages 200a, i.e., a subset of the messages 200 from the CAN interface 305.

The computer, e.g., the SecOC block 320, is programmed to check security features of the selected messages 200a, i.e., of the messages 200 received by the SecOC block 320. The SecOC block 320 may check the freshness value 225 and the message authentication code 220 from each selected message 200a, as will be described in turn. The SecOC block 320, upon checking the security features, e.g., upon verifying the message authentication code 220, forwards the result of the verification to the filter CDD block 315.

The freshness value manager 325 may track the current freshness value and forward the current freshness value to the SecOC block 320. The SecOC block 320 may compare the current freshness value with the freshness value 225 in the selected message 200a. The SecOC block 320 determines that the message 200 passes a freshness check in response to the freshness value 225 from the message 200 matching the current freshness value, and the SecOC block 320 determines that the message 200 does not pass the freshness check in response to the freshness value 225 from the message 200 being different from the current freshness value.

The computer, e.g., the hardware security module 330, verifies the message authentication code 220 from the selected message 200a. The SecOC block 320 may forward the selected messages 200a to the hardware security module 330. The hardware security module 330 may perform a cryptographic operation on the message authentication code 220 to verify the message authentication code 220, e.g., according to a cryptographic algorithm using a stored authentication key stored in the memory of the computer. For example, the hardware security module 330 may perform an operation that results in a reproduced authentication key and then determine whether the reproduced authentication key matches the stored authentication key. If the reproduced authentication key matches the stored authentication key, the verification is successful, and if the reproduced authentication key does not match the stored authentication key, the verification is unsuccessful.

The hardware security module 330 may be a distinct physical computing device, e.g., a processor or coprocessor, that is distinct from the processors executing the other components of the messaging architecture 300. In other words, the hardware security module 330 executes the verification of the message authentication codes 220, and other processors execute the other components of the messaging architecture 300. The processor serving as the hardware security module 330 and the other processors performing the rest of the messaging architecture 300 may be included in the same ECU 110. For example, the hardware security module 330 may be one or more secure cryptoprocessor chips.

The computer, e.g., the filter CDD block 315, sets the current trust status by tracking the verifications of the selected message 200a received from the SecOC block 320. The filter CDD block 315 may change the trust status in response to a minimum number of consecutive successful or consecutive unsuccessful verifications 415 of the message authentication codes 220. For example, the filter CDD block 315 may, upon receiving successful verifications of the message authentication codes 220 of selected messages 200a for a consecutive number of times equal to a trust threshold, set the current trust status to trusted. As one example, the trust threshold may be 2. The filter CDD block 315 receives a successful verification of a first selected message 200a and leaves the trust status unchanged. Then the filter CDD block 315 receives a successful verification of a second selected message 200a in a row and sets the trust status to trusted. Similarly, the filter CDD block 315 may, upon receiving unsuccessful verifications of the message authentication codes 220 of selected messages 200a for a consecutive number of times equal to a distrust threshold, set the current trust status to distrusted. The trust threshold and the distrust threshold may have the same or different values.

The filter CDD block 315 may store the current trust status. For example, the filter CDD block 315 may overwrite the previous trust status with the current trust status.

The computer, e.g., the filter CDD block 315, may adjust the ceiling value 405 based on determining the trust status, e.g., verifying the message authentication code 220. For example, the filter CDD block 315 may increase the ceiling value 405 upon successfully verifying the message authentication code 220. The filter CDD block 315 may increase the ceiling value 405 up to a preset maximum value 420. The filter CDD block 315 may decrease the ceiling value 405 upon unsuccessfully verifying the message authentication code 220. The filter CDD block 315 may decrease the ceiling value 405 down to a preset minimum value, e.g., the floor value 425. The computer, e.g., the filter CDD block 315, may determine an amount by which to adjust the ceiling value 405. For example, the filter CDD block 315 may increase or decrease the ceiling value 405 by a preset amount, e.g., 1, i.e., the adjustment is linear. For another example, the filter CDD block 315 may determine the amount by which to adjust the ceiling value 405 based on a consecutive number of successful or unsuccessful verifications, e.g., decreasing the ceiling value 405 by more for repeated unsuccessful verifications, i.e., nonlinear adjustment. The adjustments may make the messaging architecture 300 more or less sensitive in response to detecting a potential attack.

The computer, e.g., the filter CDD block 315, may adjust a probability of randomly selecting a message 200 as the selected message 200a based on verifying the message authentication code 220. For example, the filter CDD block 315 may decrease the probability value upon successfully verifying the message authentication code 220. The filter CDD block 315 may decrease the probability value down to a preset minimum value. The filter CDD block 315 may increase the probability value upon unsuccessfully verifying the message authentication code 220. The filter CDD block 315 may increase the probability value up to a preset maximum value. The adjustments may make the messaging architecture 300 more sensitive in response to detecting a potential attack.

The foregoing steps performed by the messaging architecture 300 may be performed specific to a value of the message identifier 205. In other words, the messaging architecture 300 may address messages 200 having the same value of the message identifier 205 together in the manner just described, and the messaging architecture 300 may address messages 200 with different message identifiers 205 separately. The trust threshold, distrust threshold, ceiling value 405, and probability value may each be specific to the message identifier 205. In other words, the computer may store different trust thresholds for different message identifiers 205, different distrust thresholds for different message identifiers 205, different ceiling values 405 for different message identifiers 205, and different probability values for different message identifiers 205. The numbers of consecutive nonselected messages 200b, consecutive successful verifications 410, and consecutive unsuccessful verifications 415 may be tracked separately for each message identifier 205.

Figure 4:
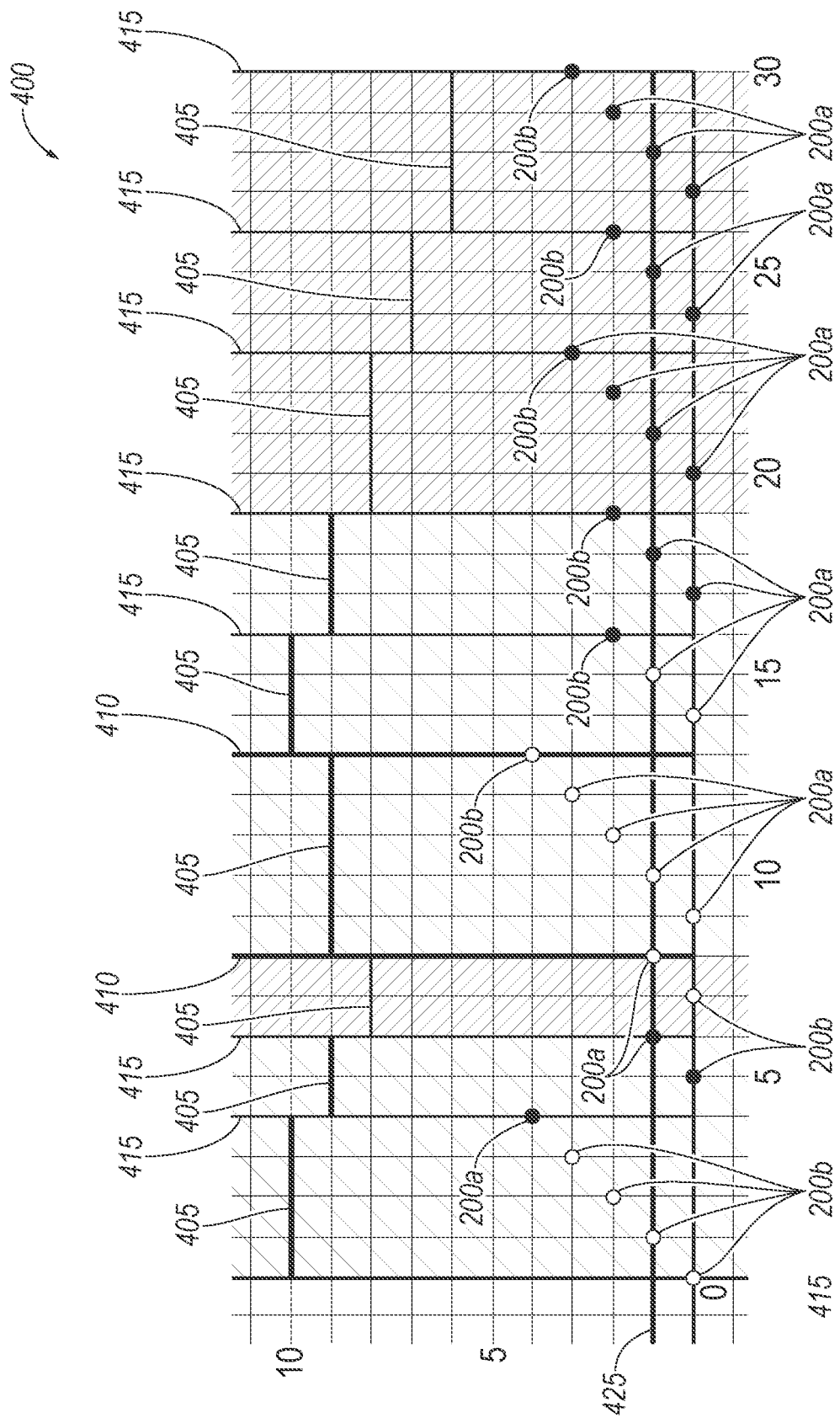
FIG. 4 is a plot of an example sequence of selectively verifying messages by the architecture.

With reference to FIG. 4, an example sequence 400 is plotted for the messaging architecture 300. The horizontal axis represents the messages 200 received having the same message identifier 205, with the first message 200 numbered 0. The vertical axis represents the consecutive number of nonselected messages 200b. In this example, the trust status is initially trusted, the ceiling value 405 is initially 10, the preset maximum value 420 for the ceiling value 405 is 10, the floor value 425 is 1, the trust threshold is 1, and the distrust threshold is 2.

For the messages 200 numbered 0 through 3 (i.e., the first four messages 200), the filter CDD block 315 randomly does not select the messages 200. The previous trust status thereby remains unchanged as trusted (indicated with the shading pattern). In parallel, the PDUR 310 forwards the messages 200 to the application 335 because the previous trust status is and remains trusted.

For the message 200 numbered 4 (i.e., the fifth message 200), the PDUR 310 forwards the message 200 to the application 335 because the previous trust status is trusted. In parallel, the filter CDD block 315 randomly selects the message 200 for verification, and the verification is unsuccessful. Because the number of consecutive unsuccessful verifications 415 is less than the distrust threshold (i.e., 1<2), the filter CDD block 315 maintains the trust status as trusted. The filter CDD block 315 decreases the ceiling value 405 from 10 to 9 in response to the unsuccessful verification 415.

For the message 200 numbered 5, the PDUR 310 forwards the message 200 to the application 335 because the previous trust status is trusted. In parallel, the filter CDD block 315 does not select the message 200 for verification because the number of messages 200 received since the last verification has not reached the floor value 425. The previous trust status thereby remains unchanged as trusted.

For the message 200 numbered 6, the PDUR 310 forwards the message 200 to the application 335 because the previous trust status is trusted. In parallel, the filter CDD block 315 randomly selects the message 200 for verification, and the verification is unsuccessful. Because the number of consecutive unsuccessful verifications 415 equals the distrust threshold (i.e., 2=2), the filter CDD block 315 sets the current trust status to distrusted (indicated by the change in shading from the left of 6 to the right of 6). The filter CDD block 315 decreases the ceiling value 405 from 9 to 8 in response to the unsuccessful verification 415.

For the message 200 numbered 7, the PDUR 310 discards the message 200 because the previous trust status (i.e., the current trust status of the message 200 numbered 6) is now distrusted. In parallel, the filter CDD block 315 does not select the message 200 for verification because the number of messages 200 received since the last verification has not reached the floor value 425. The previous trust status thereby remains unchanged as distrusted.

For the message 200 numbered 8, the PDUR 310 discards the message 200 because the previous trust status is distrusted. In parallel, the filter CDD block 315 randomly selects the message 200 for verification, and the verification is successful. Because the number of consecutive successful verifications 410 equals the trust threshold (i.e., 1=1), the filter CDD block 315 sets the current trust status to trusted. The filter CDD block 315 increases the ceiling value 405 from 8 to 9 in response to the successful verification 410.

For the messages 200 numbered 9 through 12, the PDUR 310 forwards the message 200 to the application 335 because the previous trust status (i.e., the current trust status of message 200 8) is trusted. In parallel, the filter CDD block 315 randomly does not select the message 200 for verification. The previous trust status thereby remains unchanged as trusted.

For the message 200 numbered 13, the PDUR 310 forwards the message 200 to the application 335 because the previous trust status is trusted. In parallel, the filter CDD block 315 randomly selects the message 200 for verification, and the verification is successful. Because the number of consecutive successful verifications 410 exceeds the trust threshold (i.e., 2>1), the filter CDD block 315 sets the current trust status to trusted. The filter CDD block 315 increases the ceiling value 405 from 9 to 10 in response to the successful verification 410. The preset maximum value 420 for the ceiling value 405 is 10, so the ceiling value 405 cannot be further increased.

For the messages 200 numbered 14 and 15, the PDUR 310 forwards the message 200 to the application 335 because the previous trust status is trusted. In parallel, the filter CDD block 315 randomly does not select the message 200 for verification. The previous trust status thereby remains unchanged as trusted.

For the message 200 numbered 16, the PDUR 310 forwards the message 200 to the application 335 because the previous trust status is trusted. In parallel, the filter CDD block 315 randomly selects the message 200 for verification, and the verification is unsuccessful. Because the number of consecutive unsuccessful verifications 415 is less than the distrust threshold (i.e., 1<2), the filter CDD block 315 maintains the trust status as trusted. The filter CDD block 315 decreases the ceiling value 405 from 10 to 9 in response to the unsuccessful verification 415.

For the messages 200 numbered 17 and 18, the PDUR 310 forwards the messages 200 to the application 335 because the previous trust status is trusted. In parallel, the filter CDD block 315 randomly does not select the message 200 for verification. The previous trust status thereby remains unchanged as trusted.

For the message 200 numbered 19, the PDUR 310 forwards the message 200 to the application 335 because the previous trust status is trusted. In parallel, the filter CDD block 315 randomly selects the message 200 for verification, and the verification is unsuccessful. Because the number of consecutive unsuccessful verifications 415 equals the distrust threshold (i.e., 2=2), the filter CDD block 315 sets the current trust status to distrusted. The filter CDD block 315 decreases the ceiling value 405 from 9 to 8 in response to the unsuccessful verification 415.

For the messages 200 numbered 20 through 22, the PDUR 310 discards the messages 200 because the previous trust status (i.e., the current trust status of the message 200 numbered 19) is now distrusted. In parallel, the filter CDD block 315 randomly does not select the message 200 for verification. The previous trust status thereby remains unchanged as distrusted.

For the message 200 numbered 23, the PDUR 310 discards the message 200 because the previous trust status is distrusted. In parallel, the filter CDD block 315 randomly selects the message 200 for verification, and the verification is unsuccessful. Because the number of consecutive unsuccessful verifications 415 exceeds the distrust threshold (i.e., 3>2), the filter CDD block 315 sets the current trust status to distrusted. The filter CDD block 315 decreases the ceiling value 405 from 8 to 7 in response to the unsuccessful verification 415.

For the messages 200 numbered 24 and 25, the PDUR 310 discards the messages 200 because the previous trust status is distrusted. In parallel, the filter CDD block 315 randomly does not select the message 200 for verification. The previous trust status thereby remains unchanged as distrusted.

For the message 200 numbered 26, the PDUR 310 discards the message 200 because the previous trust status is distrusted. In parallel, the filter CDD block 315 randomly selects the message 200 for verification, and the verification is unsuccessful. Because the number of consecutive unsuccessful verifications 415 exceeds the distrust threshold (i.e., 4>2), the filter CDD block 315 sets the current trust status to distrusted. The filter CDD block 315 decreases the ceiling value 405 from 7 to 6 in response to the unsuccessful verification 415.

For the messages 200 numbered 27 through 29, the PDUR 310 discards the messages 200 because the previous trust status is distrusted. In parallel, the filter CDD block 315 randomly does not select the message 200 for verification. The previous trust status thereby remains unchanged as distrusted.

For the message 200 numbered 30, the PDUR 310 discards the messages 200 because the previous trust status is distrusted. In parallel, the filter CDD block 315 randomly selects the message 200 for verification, and the verification is unsuccessful. The handling of messages 200 may proceed from there in the same manner.

Figure 5:
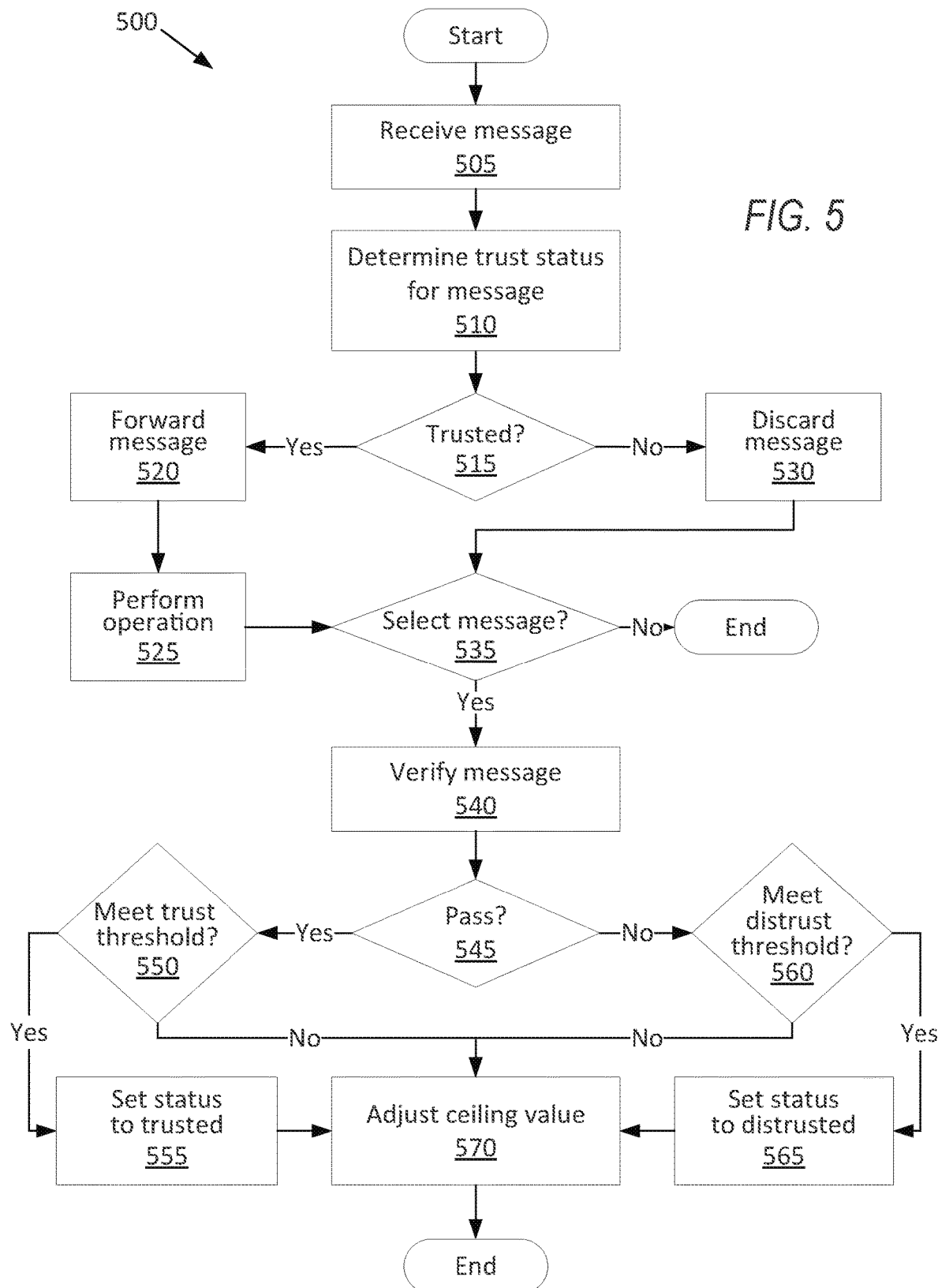
FIG. 5 is a flowchart of an example process for selectively verifying the messages.

FIG. 5 is a flowchart illustrating an example process 500 for selectively verifying the messages 200. The memory of the computer stores executable instructions for performing the steps of the process 500 and/or programming can be implemented in structures such as mentioned above. As a general overview of the process 500, the computer receives a message 200 and determines the previous trust status for the message 200. If the previous trust status is trusted, the computer forwards the message 200 to the application 335. If the previous trust status is distrusted, the computer discards the message 200. If the computer randomly selects the message 200, the computer verifies the message authentication code 220 from the message 200. If the verification is successful and the number of consecutive successful verifications 410 meets the trust threshold, the computer sets the current trust status to trusted. If the verification is unsuccessful and the number of consecutive unsuccessful verifications 415 meets the distrust threshold, the computer sets the current trust status to distrusted. The computer adjusts the ceiling value 405 based on the verification. The computer may repeat the process 500 for each message 200 received.

The process 500 begins in a block 505, in which the computer, e.g., the PDUR 310, receives a message 200, as described above.

Next, in a block 510, the computer, e.g., the filter CDD block 315, determines the previous trust status for the message identifier 205 of the message 200 received in the block 505, as described above. The previous trust status is the most recent current trust status determined from previously executing the process 500.

Next, in a decision block 515, the computer, e.g., the PDUR 310, determines the previous trust status returned in the block 510. In response to the previous trust status being trusted, the process 500 proceeds to a block 520. In response to the previous trust status being distrusted, the process 500 proceeds to a block 525.

In the block 520, the computer, e.g., the PDUR 310, forwards the message 200 to a recipient such as the application 335, as described above.

Next, in a block 525, the computer, e.g., the application 335, performs an operation based on the data content 215 of the message 200, as described above. After the block 525, the process 500 proceeds to a decision block 535. The computer may perform the block 525 and decision block 535 in parallel.

In the block 530, the computer, e.g., the PDUR 310, discards the message 200, as described above. Accordingly, the computer, i.e., the application 335, refrains from performing an operation based on the data content 215 of the message 200, as the application 335 does not receive the message 200. After the block 530, the process 500 proceeds to the decision block 535.

In the decision block 535, the computer, e.g., the filter CDD block 315, determines whether to select the message 200 for verification. For example, the computer randomly determines whether to select the message 200 according to a probability value stored in memory, as described above. For another example, the computer selects the message 200 in response to randomly not selecting a message 200 for a consecutive number of times equal to the ceiling value 405, as described above. In response to not selecting the message 200 for verification, the process 500 ends. In response to selecting the message 200 for verification, the process 500 proceeds to a block 540.

In the block 540, the computer, e.g., the SecOC block 320 via the hardware security module 330, verifies the message authentication code 220 from the selected message 200a, as described above.

Next, in a decision block 545, the computer, e.g., the SecOC block 320, determines whether the verification in the block 540 was successful or unsuccessful. In response to a successful verification 410, the process 500 proceeds to a decision block 550. In response to an unsuccessful verification 415, the process 500 proceeds to a decision block 560.

In the decision block 550, the computer, e.g., the SecOC block 320, determines whether a number of consecutive successful verifications 410 of selected messages 200a equals or exceeds the trust threshold, as described above. In response to the number of consecutive successful verifications 410 meeting or exceeding the trust threshold, the process 500 proceeds to a block 555. Otherwise, the process 500 proceeds to a block 570.

In the block 555, the computer, e.g., the filter CDD block 315, sets the current trust status to trusted, as described above. After the block 555, the process 500 proceeds to the block 570.

In the decision block 560, the computer, e.g., the SecOC block 320, determines whether a number of consecutive unsuccessful verifications 415 of selected messages 200a equals or exceeds the distrust threshold, as described above. In response to the number of consecutive unsuccessful verifications 415 meeting or exceeding the distrust threshold, the process 500 proceeds to a block 565. Otherwise, the process 500 proceeds to the block 570.

In the block 565, the computer, e.g., the filter CDD block 315, sets the current trust status to distrusted, as described above. After the block 565, the process 500 proceeds to the block 570.

In the block 570, the computer, e.g., the filter CDD block 315, adjusts the ceiling value 405 based on the verification of the selected message 200a, as described above. After the block 570, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first," "second," etc. are used throughout this document as identifiers and are not intended to signify importance, order, or quantity. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
nondeterministically select a message from a plurality of messages, the messages including respective message authentication codes, wherein the instructions to nondeterministically select the selected message include instructions to, upon receiving a first message of the messages, randomly determine whether to select the first message as the selected message;
set a current trust status by verifying the message authentication code from the selected message;
adjust a probability of randomly selecting the first message as the selected message based on determining the current trust status; and
forward the selected message to a recipient in response to a previous trust status being trusted.

2. The computer of claim 1, wherein the instructions to nondeterministically select the selected message include instructions to randomly select the selected message.

3. The computer of claim 1, wherein the instructions to nondeterministically select the selected message include instructions to, upon randomly not selecting one of the messages as the selected message for a consecutive number of times equal to a ceiling value, select a next message as the selected message.

4. The computer of claim 3, wherein the instructions further include instructions to adjust the ceiling value based on verifying the message authentication code.

5. The computer of claim 3, wherein the instructions further include instructions to increase the ceiling value upon successfully verifying the message authentication code.

6. The computer of claim 3, wherein the instructions further include instructions to decrease the ceiling value upon unsuccessfully verifying the message authentication code.

7. The computer of claim 1, wherein the instructions to set the current trust status include instructions to, upon successfully verifying the message authentication codes of selected messages including the selected message for a consecutive number of times equal to a trust threshold, set the current trust status to trusted.

8. The computer of claim 1, wherein the instructions to set the current trust status include instructions to, upon unsuccessfully verifying the message authentication codes of selected messages including the selected message for a consecutive number of times equal to a distrust threshold, set the current trust status to distrusted.

9. The computer of claim 1, wherein the instructions further include instructions to discard the selected message in response to the previous trust status being distrusted.

10. The computer of claim 1, wherein the instructions further include instructions to forward a nonselected message from the messages to a recipient in response to the previous trust status being trusted.

11. The computer of claim 1, wherein the instructions further include instructions to discard a nonselected message from the messages in response to the previous trust status being distrusted.

12. The computer of claim 1, wherein the plurality of the messages include a same value of message identifier, and the current trust status and previous trust status are specific to the value of the message identifier.

13. The computer of claim 1, wherein the messages are controller area network (CAN) messages.

14. A method comprising:
nondeterministically selecting a message from a plurality of messages, the messages including respective message authentication codes, wherein nondeterministically selecting the selected message includes, upon receiving a first message of the messages, randomly determining whether to select the first message as the selected message;
setting a current trust status by verifying the message authentication code from the selected message;
adjusting a probability of randomly selecting the first message as the selected message based on determining the current trust status; and
forwarding the selected message to a recipient in response to a previous trust status being trusted.

15. The method of claim 14, wherein nondeterministically selecting the selected message includes randomly selecting the selected message.

16. The method of claim 14, wherein setting the current trust status includes, upon successfully verifying the message authentication codes of selected messages including the selected message for a consecutive number of times equal to a trust threshold, setting the current trust status to trusted.

17. The method of claim 14, further comprising discarding the selected message in response to the previous trust status being distrusted.

18. A computer comprising a processor and a memory, the memory storing instructions executable by the processor to:
nondeterministically select a message from a plurality of messages, the messages including respective message authentication codes, wherein the instructions to nondeterministically select the selected message include instructions to, (1) upon receiving a first message of the messages, randomly determine whether to select the first message as the selected message, and (2) upon randomly not selecting one of the messages as the selected message for a consecutive number of times equal to a ceiling value, select a next message as the selected message;
set a current trust status by verifying the message authentication code from the selected message; and
forward the selected message to a recipient in response to a previous trust status being trusted.

19. The computer of claim 18, wherein the instructions further include instructions to adjust the ceiling value based on verifying the message authentication code.

20. The computer of claim 18, wherein the instructions further include instructions to increase the ceiling value upon successfully verifying the message authentication code.

* * * * *